(12) United States Patent
Yu et al.

(10) Patent No.: US 8,427,503 B2
(45) Date of Patent: Apr. 23, 2013

(54) METHOD, APPARATUS AND COMPUTER PROGRAM PRODUCT FOR CREATING GRAPHICAL OBJECTS WITH DESIRED PHYSICAL FEATURES FOR USAGE IN ANIMATION

(75) Inventors: Kun Yu, Beijing (CN); Hao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 996 days.

(21) Appl. No.: 12/467,659

(22) Filed: May 18, 2009

(65) Prior Publication Data

US 2010/0289807 A1    Nov. 18, 2010

(51) Int. Cl.
*G09G 5/00*    (2006.01)

(52) U.S. Cl.
USPC .......................................... 345/619; 345/589

(58) Field of Classification Search .................. 345/619, 345/589
See application file for complete search history.

(56) References Cited

U.S. PATENT DOCUMENTS

| | | |
|---|---|---|
| 2003/0016222 A1 | 1/2003 | Budin et al. |
| 2004/0036711 A1 | 2/2004 | Anderson |
| 2005/0231512 A1 | 10/2005 | Niles et al. |
| 2009/0110307 A1 | 4/2009 | Markowitz |

FOREIGN PATENT DOCUMENTS

| | | |
|---|---|---|
| WO | WO 03/050763 A1 | 6/2003 |
| WO | WO 2006/133125 A2 | 12/2006 |

OTHER PUBLICATIONS

International Search Report and Written Opinion of corresponding international applidatin NO. PCT/IB2010/001151 mailed Sep. 14, 2010.
International Search Report and Written Opinion (corrected copy) of corresponding international application No. PCT/IB2010/001151 mailed Sep. 27, 2010.

*Primary Examiner* — Maurice L McDowell, Jr.
(74) *Attorney, Agent, or Firm* — Alston & Bird LLP (57) ABSTRACT

An apparatus for modifying one or more physical attributes and properties of a graphical element and transferring these physical attributes and properties to a graphical object for usage in an animation may include a processor and a memory storing executable computer program code that cause the apparatus to at least perform operations including receiving a selection of a physical attribute(s) among a plurality of physical attributes and adjusting an intensity associated with the selected physical attribute. The computer program code may further cause the apparatus to assign the physical attribute to a graphical element(s) and modify one or more physical properties of the graphical element based on the selected physical attribute and the adjusted intensity. The computer program code may further cause the apparatus to transfer the modified physical properties of the graphical element to a graphical object. A corresponding method and computer program product are also provided.

17 Claims, 7 Drawing Sheets

Elastic Element:

FIG. 4A.

Fragile Element:

FIG. 4B.

Fragile & Elastic Element:

METHOD, APPARATUS AND COMPUTER PROGRAM PRODUCT FOR CREATING GRAPHICAL OBJECTS WITH DESIRED PHYSICAL FEATURES FOR USAGE IN ANIMATION

TECHNOLOGICAL FIELD

Embodiments of the present invention relate generally to user interface technology and, more particularly, relate to a method, apparatus, and computer program product for adjusting the physical attributes and properties of graphical elements that may be used in animations.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, etc.

In many situations, it may be desirable for the user to interface with a device such as a mobile terminal for the provision of an application or service. A user's experience during certain applications such as, for example, web browsing or applications that enable drawing may be enhanced by using a touch screen display as the user interface. Furthermore, some users may have a preference for use of a touch screen display for entry of user interface commands or simply creating content over other alternatives. In recognition of the utility and popularity of touch screen displays, many devices, including some mobile terminals, now employ touch screen displays. As such, touch screen devices are now relatively well known, with numerous different technologies being employed for sensing a particular point at which an object may contact the touch screen display.

Touch screen devices may also be used for entering user interface commands to generate animations. In this regard, many existing pen-based devices are featured with tools supporting animation composition and control. It is known that animations typically require more user actions to be performed and more effort to compose and modify than some other types of media such as for example images and text. As such, usage of these pen-based devices and tools are designed to enhance a user's experience in composing an animation. However, the existing pen-based devices and tools that are currently being employed to generate animations are typically too complex and cumbersome for most users to utilize effectively and these pen-based devices and tools are typically not well-suited for generating complex animations. For instance, these existing solutions typically do not have the capability to utilize complex objects in animations. Moreover, usage of the existing pen-based devices and tools may take a user a number of hours to compose an animation that lasts only a few minutes, which may result in a lack of interest to the user in creating animations and may also result in frustration.

As such, it is desirable to provide a touch screen device with user interface commands that is easy to utilize in creating and modifying animations.

BRIEF SUMMARY

A method, apparatus and computer program product are therefore provided for assigning one or more physical attributes and properties to graphical elements and the physical attributes and properties assigned to the graphical elements may be transferred to corresponding graphical objects that may be used in one or more animations. As referred to herein an animation may relate to movement of one or more graphical objects or elements from one location to one or more other locations as well as display of a sequence of images. The animations may, but need not, be utilized in video clips, movies, video games or any other media consisting of a sequence of images or scenes. The physical attributes and properties may be predefined and may be chosen by a user for modifying the physical properties of a graphical element. The graphical elements and graphical objects of the exemplary embodiments may consist of images, pictures, photographs or the like.

Moreover, it should be pointed out that the graphical elements may be representations of simple or basic geometrical representations including, but not limited to, rectangles, squares, triangles, circles, ellipses and the like. In this regard, the exemplary embodiments may provide a user-friendly mechanism in which to transfer physical attributes and properties assigned to basic geometrical objects to more complex graphical objects such as for example three-dimensional (3-D) objects.

Additionally, the exemplary embodiments are capable of detecting different touch gestures which may be utilized to exert one or more forces on the graphical objects and elements, and these applied forces may be used to test the physical attributes and properties that may be applied to the graphical objects during an animation. If the behavior of the assigned physical attributes and properties are unsatisfactory they may be changed. In this manner, the exemplary embodiments allow customization of an animation with graphical objects that have desired physical properties and attributes that may be chosen by a user. This may enhance a user's experience in generating content associated with the creation of animations.

In one exemplary embodiment, a method for modifying one or more physical attributes and properties of a graphical element and transferring these physical attributes and properties to a graphical object for usage in an animation is provided. The method may include receiving a selection of a physical attribute among a plurality of physical attributes and adjusting an intensity associated with the selected physical attribute. The method may further include assigning the physical attribute to a graphical element and modifying one or more physical properties of the graphical element based on the physical attribute and the adjusted intensity. The method may further include testing a physical effect(s) corresponding to the assigned attribute and transferring the modified physical properties of the graphical element to at least one graphical object.

In another exemplary embodiment, a computer program product for modifying one or more physical attributes and properties of a graphical element and transferring these physical attributes and properties to a graphical object for usage in an animation is provided. The computer program product includes at least one computer-readable storage medium having computer-executable program code instructions stored therein. The computer-executable program code instructions may include program code instructions for causing receipt of a selection of a physical attribute among a plurality of physical attributes and for adjusting the intensity associated with the selected physical attribute. The program code instructions may also assign the physical attribute to a graphical element and modify one or more physical properties of the graphical element based on the physical attribute and the adjusted intensity. The program code instructions may also cause transfer of the modified physical properties of the graphical element to a graphical object.

In another exemplary embodiment, an apparatus for modifying one or more physical attributes and properties of a graphical element and transferring these physical attributes and properties to a graphical object for usage in an animation is provided. The apparatus may include a processor and a memory including computer program code. The memory and the computer program code configured to, with the processor, cause (1) the apparatus or (2) another apparatus to at least perform operations including receiving a selection of a physical attribute among a plurality of physical attributes and adjusting an intensity associated with the selected physical attribute. The computer program code may further cause the apparatus or the another apparatus to assign the physical attribute to a graphical element and modify one or more physical properties of the graphical element based on the selected physical attribute and the adjusted intensity. The computer program code may further cause the apparatus or the another apparatus to transfer the modified physical properties of the graphical element to a graphical object.

Embodiments of the invention may provide a method, apparatus and computer program product for improving touch screen interface performance. As a result, for example, mobile terminal users may enjoy improved capabilities with respect to interfacing with services or applications that may be used in connection with a touch screen display.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 4 (which includes FIGS. 4A through 4C) shows an example of animations having graphical elements with altered attributes and properties according to an exemplary embodiment of the present invention;

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

In certain environments, such as when used in connection with a mobile terminal, creation of animations via a user interface of a touch screen may be important to users for content generation and entertainment purposes. For instance, mobile terminals have become heavily relied upon by users for enabling generation of video clips, playing video games and/or other entertainment purposes. Accordingly, it may be desirable to provide a mechanism for improving user experience in connection with creating animations via a touch screen.

As indicated above, some embodiments of the present invention may improve touch screen interface performance by providing a user-friendly input interface that allows users to adjust physical attributes and properties of simple or basic graphical elements (e.g., graphical representations of geometrical objects such as for example, circles, rectangles, triangles, etc.) to facilitate the creation of animations with desired physical effects. The physical attributes that are capable of being assigned to basic graphical elements may relate to attributes associated with the softness, rigidity, frangibility, elasticity, fluidity and manipulation of hinges, etc. to achieve desired physical effects. These physical effects can be easily transplanted from the basic geometrical elements to complex graphical elements (e.g., three-dimensional (3-D) objects such as for example a graphical representation of a tree) and thereby provide users with a convenient mechanism for establishing physical attributes for selected graphical elements and objects. The graphical objects having the transplanted physical attributes may be utilized in an animation. In this regard, the exemplary embodiments provide an efficient and user-friendly manner in which to allow complex graphical objects to be used in animations.

Figure 1:
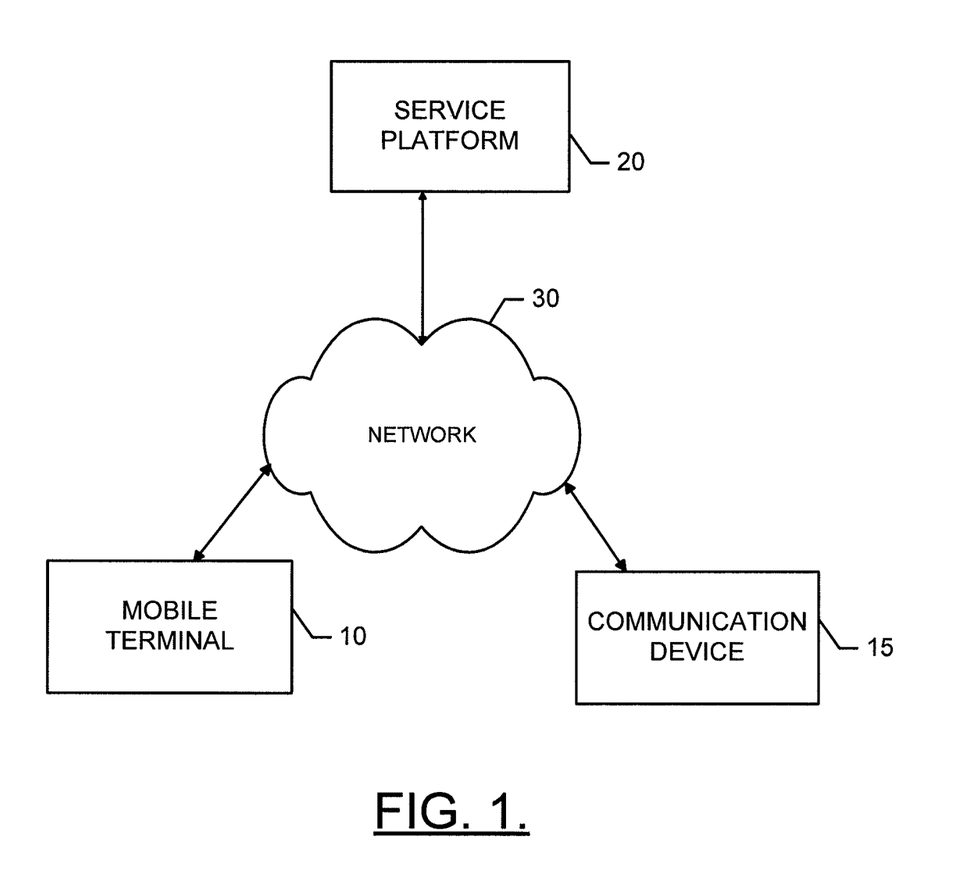
FIG. 1 is a schematic block diagram of a system according to a exemplary embodiment of the present invention.

FIG. 1 illustrates a block diagram of a system that may benefit from embodiments of the present invention. It should be understood, however, that the system as illustrated and hereinafter described is merely illustrative of one system that may benefit from embodiments of the present invention and, therefore, should not be taken to limit the scope of embodiments of the present invention. As shown in FIG. 1, an embodiment of a system in accordance with an example embodiment of the present invention may include a mobile terminal 10 capable of communication with numerous other devices including, for example, a service platform 20 via a network 30. In some embodiments of the present invention, the system may further include one or more additional communication devices (e.g., communication device 15) such as other mobile terminals, personal computers (PCs), servers, network hard disks, file storage servers, and/or the like, that are capable of communication with the mobile terminal 10 and accessible by the service platform 20. However, not all systems that employ embodiments of the present invention may comprise all the devices illustrated and/or described herein. Moreover, in some cases, embodiments may be practiced on a standalone device independent of any system.

The mobile terminal 10 may be any of multiple types of mobile communication and/or computing devices such as, for example, portable digital assistants (PDAs), pagers, mobile televisions, mobile telephones, gaming devices, laptop computers, cameras, camera phones, video recorders, audio/video players, radios, global positioning system (GPS) devices, or any combination of the aforementioned, and other types of voice and text communications systems. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30.

Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), e.g., the Internet. In turn, other devices such as processing elements (e.g., personal computers, server computers or the like) may be included in or coupled to the network 30. By directly or indirectly connecting the mobile terminal 10 and the other devices (e.g., service platform 20, or other mobile terminals or devices such as the communication device 15) to the network 30, the mobile terminal 10 and/or the other devices may be enabled to communicate with each other, for example, according to numerous communication protocols, to thereby carry out various communication or other functions of the mobile terminal 10 and the other devices, respectively. As such, the mobile terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi (Wireless Fidelity), ultra-wide band (UWB), Wibree techniques and/or the like and fixed access mechanisms such as digital subscriber line (DSL), cable modems, Ethernet and/or the like.

In an example embodiment, the service platform 20 may be a device or node such as a server or other processing element. The service platform 20 may have any number of functions or associations with various services. As such, for example, the service platform 20 may be a platform such as a dedicated server (or server bank) associated with a particular information source or service (e.g., a service associated with sharing user interface settings), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information to users of communication devices. However, at least some of the functionality provided by the service platform 20 may be data processing and/or service provision functionality provided in accordance with embodiments of the present invention.

In an exemplary embodiment, the mobile terminal 10 may employ an apparatus (e.g., the apparatus of FIG. 2) capable of employing embodiments of the present invention. Moreover, the communication device 15 may also implement embodiments of the present invention.

Figure 2:
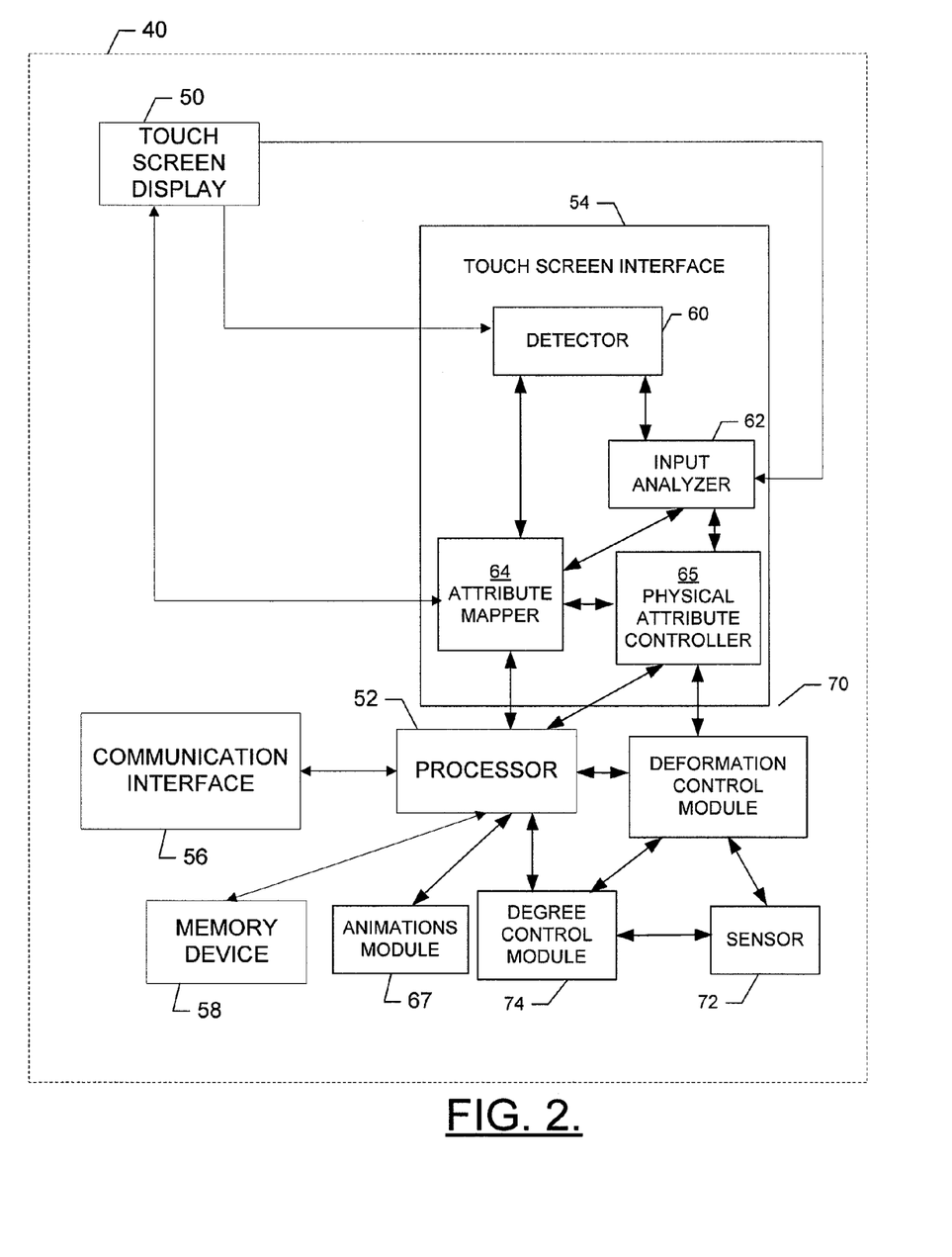
FIG. 2 is a schematic block diagram of an apparatus for applying physical attributes to graphical elements for use with touch screen devices according to an exemplary embodiment of the present invention.

FIG. 2 illustrates a block diagram of an apparatus that may benefit from embodiments of the present invention. It should be understood, however, that the apparatus as illustrated and hereinafter described is merely illustrative of one apparatus that may benefit from embodiments of the present invention and, therefore, should not be taken to limit the scope of embodiments of the present invention. In one exemplary embodiment, the apparatus of FIG. 2 may be employed on a mobile terminal (e.g., mobile terminal 10) capable of communication with other devices via a network. However, in some cases, the apparatus on which embodiments of the present invention are practiced may be a fixed terminal and/or a terminal that does not communicate with other devices. As such, not all systems that may employ embodiments of the present invention are described herein. Moreover, other structures for apparatuses employing embodiments of the present invention may also be provided and such structures may include more or less components than those shown in FIG. 2. Thus, some embodiments may comprise more or less than all the devices illustrated and/or described herein. Furthermore, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, an apparatus for employing a user-friendly input interface in communication with a touch screen display is provided. The apparatus 40 may include or otherwise be in communication with a touch screen display 50, a processor 52, a touch screen interface 54, a communication interface 56 and a memory device 58. The memory device 58 may include, for example, volatile and/or non-volatile memory. The memory device 58 may be configured to store information, data, applications, instructions or the like for enabling the apparatus to carry out various functions in accordance with exemplary embodiments of the present invention. For example, the memory device 58 could be configured to buffer input data for processing by the processor 52. Additionally or alternatively, the memory device 58 could be configured to store instructions for execution by the processor 52. As yet another alternative, the memory device 58 may be one of a plurality of databases or storage locations that store information and/or media content. Additionally, the memory device 58 may be configured to store one or more graphical elements including but not limited to images, pictures, photographs or the like of objects. Some of the objects may include geometrical objects such as rectangles, squares, triangles, circles, ellipses, etc. as well as any other suitable objects that may be represented graphically.

The processor 52 may be embodied in a number of different ways. For example, the processor 52 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In one embodiment, the processor 52 may be one or more processors operating in concert. In an exemplary embodiment, the processor 52 may be configured to execute instructions stored in the memory device 58 or otherwise accessible to the processor 52. As such, whether configured by hardware or software methods, or by a combination thereof, the processor 52 may represent an entity capable of performing operations according to embodiments of the present invention while configured accordingly.

Meanwhile, the communication interface 56 may be any means such as a device or circuitry embodied in either hardware, software, or a combination of hardware and software that is configured to receive and/or transmit data from/to a network and/or any other device or module in communication with the apparatus 40. In this regard, the communication interface 56 may include, for example, an antenna (or multiple antennas) and supporting hardware and/or software for enabling communications with a wireless communication network. In fixed environments, the communication interface 56 may alternatively or also support wired communication. As such, the communication interface 56 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 56 may include hardware and/or software for supporting communication mechanisms such as Bluetooth, Infrared, ultra-wideband (UWB), WiFi, and/or the like.

The touch screen display 50 may be embodied as any known touch screen display. Thus, for example, the touch screen display 50 could be configured to enable touch recognition by any suitable technique, such as resistive, capacitive, infrared, strain gauge, surface wave, optical imaging, dispersive signal technology, acoustic pulse recognition, or other like techniques. The touch screen interface 54 may be in communication with the touch screen display 50 to receive indications of user inputs at the touch screen display 50 and to modify a response to such indications based on corresponding user actions that may be inferred or otherwise determined responsive to the indications. In this regard, the touch screen interface 54 may be any device or means embodied in either hardware, software, or a combination of hardware and software configured to perform the respective functions associated with the touch screen interface 54 as described below. In an exemplary embodiment, the touch screen interface 54 may be embodied in software as instructions that are stored in the memory device 58 and executed by the processor 52. Alternatively, touch screen interface 54 may be embodied as the processor 52 configured to perform the functions of the touch screen interface 54.

The touch screen interface 54 may be configured to receive an indication of an input in the form of a touch event at the touch screen display 50. Following recognition of the touch event, the touch screen interface 54 may be configured to thereafter determine a stroke event or other input gesture and provide a corresponding indication on the touch screen display 50 based on the stroke event. In this regard, for example, the touch screen interface 54 may include a detector 60 to receive indications of user inputs in order to recognize and/or determine a touch event based on each input received at the detector 60.

In an exemplary embodiment, one or more sensors (e.g., sensor 72) may be in communication with the detector 60 (via the deformation control module 72, physical attribute controller 65 and the input analyzer 62). The sensors may be any of various devices or modules configured to sense one or more conditions. In this regard, for example, a condition(s) that may be monitored by the sensor 72 may include pressure (e.g., an amount of pressure exerted by a touch event) and any other suitable parameters.

A touch event may be defined as a detection of an object, such as a stylus, finger, pen, pencil or any other pointing device, coming into contact with a portion of the touch screen display in a manner sufficient to register as a touch. In this regard, for example, a touch event could be a detection of pressure on the screen of touch screen display 50 above a particular pressure threshold over a given area. Subsequent to each touch event, the touch screen interface 54 (e.g., via the detector 60) may be further configured to recognize and/or determine a corresponding stroke event or input gesture. A stroke event (which may also be referred to as an input gesture) may be defined as a touch event followed immediately by motion of the object initiating the touch event while the object remains in contact with the touch screen display 50. In other words, the stroke event or input gesture may be defined by motion following a touch event thereby forming a continuous, moving touch event defining a moving series of instantaneous touch positions. The stroke event or input gesture may represent a series of unbroken touch events, or in some cases a combination of separate touch events. For purposes of the description above, the term immediately should not necessarily be understood to correspond to a temporal limitation. Rather, the term immediately, while it may generally correspond to relatively short time after the touch event in many instances, instead is indicative of no intervening actions between the touch event and the motion of the object defining the touch positions while such object remains in contact with the touch screen display 50. In this regard, it should be pointed out that no intervening actions cause operation or function of the touch screen. However, in some instances in which a touch event that is held for a threshold period of time triggers a corresponding function, the term immediately may also have a temporal component associated in that the motion of the object causing the touch event must occur before the expiration of the threshold period of time.

In an exemplary embodiment, the detector 60 may be configured to communicate detection information regarding the recognition or detection of a stroke event or input gesture as well as a selection of one or more graphical elements to an input analyzer 62 and/or an attribute mapper 64. The input analyzer 62 may communicate with a physical attribute controller 65. In some embodiments, the input analyzer 62, the attribute mapper 64 and the physical attribute controller 65 may each (along with the detector 60) be portions of the touch screen interface 54. In an exemplary embodiment, the touch screen interface 54 may be embodied by a processor, controller of the like. Furthermore, each of the input analyzer 62 and the attribute mapper 64 may be embodied as any means such as a device or circuitry embodied in hardware, software or a combination of hardware and software that is configured to perform corresponding functions of the input analyzer 62 and the attribute mapper 64, respectively. As pointed out above, the input analyzer 62 may communicate with the physical attribute controller 65 and in this regard, the input analyzer 62 may communicate information to the physical attribute controller 65 indicating that the detector 60 recognized that a graphical element was selected based on an indication of user input at the touch screen display 50 for example. The physical attribute controller 65 may be any means such as a device or circuitry embodied in hardware, software or a combination of hardware and software that is configured to perform corresponding functions of the physical attribute controller as described herein. In this regard, for example the physical attribute controller 65 may assign one or more physical attributes to a selected graphical element(s) that may be utilized in creating an animation. These physical attributes may be applied to selected graphical elements which change the physical properties of the graphical elements from their original state. The physical attributes that may be assigned by the physical attribute controller 65 consist of attributes associated with softness, rigidity, frangibility, elasticity, fluidity as well as the manipulation of one or more hinges and any other suitable physical attributes.

The input analyzer 62 may be configured to compare an input gesture or stroke event to various profiles of predefined input gestures and/or stroke events in order to determine a direction and an amount of force or pressure in which to apply on a portion of a graphical element. In other words, the starting point of an input gesture (e.g., touch gesture) and/or stroke event determines the manner in which force or pressure is exerted on a graphical element. The strength of the force and direction may be determined by the length of the input gesture. In this regard, if the input analyzer 62 determines that a stroke begins in an upward position external to a graphical element and ends in a downward position inside the graphical element, the input analyzer 62 may determine that a force or pressure is to be applied on a portion of the graphical element but a position of the graphical element may not be changed. If the input analyzer 62 determines that a stroke begins at a position inside of the graphical element and ends in a downward position external to the graphical element, the input analyzer 62 may determine that a force or pressure is applied to a portion of the graphical element which may change the position of the graphical element. In some embodiments, the input analyzer 62 is configured to determine stroke or line orientations (e.g., vertical, horizontal, diagonal, etc.) and various other stroke characteristics.

In general terms, the attribute mapper 64 may be configured to map the physical attributes that are applied to graphical elements, by the physical attribute controller 65, to one or more graphical objects so that the objects will have the physical attribute applied to the graphical element.

As an example, the physical attribute controller 65 may be utilized to assign a frangibility attribute to a graphical element such as for example a rectangle which causes the rectangle to become more fragile and susceptible to breaking. The attribute mapper 64 may transfer the frangibility attribute applied to the rectangle to a more complex graphical representation of an object such as for example a building.

The physical attribute controller 65 may also communicate with a deformation control module 70 and may communicate with a degree control module 74 as well as an animation module 67, via processor 52. The deformation control module 70, degree control module 74 and the animation module 67 in some embodiments, are components of the touch screen interface 54. More particularly, in some embodiments, the deformation control module 70, the degree control module 74 and the animation module 67 may be part of the physical attribute controller 65. However, in some alternative embodiments (as shown in the example of FIG. 2), the deformation control module 70, the degree control module 74 and the animation module 67 may be separate devices.

The deformation control module 70, the degree control module 74 and the animation control module 67 may be any means such as a device or circuitry embodied in hardware, software or a combination of hardware and software that is configured to perform corresponding functions of the deformation control module 70, the degree control module 74 and the animation control module 67 as described herein. In this regard, for example the deformation control module 70 may be configured to change the physical properties (e.g., a shape or size of a graphical element or object) of one or more graphical elements based on physical attributes that were assigned to a graphical element(s) by the physical attribute controller 65. For example, in response to the physical attribute controller 65 assigning a frangibility attribute to a graphical element, the deformation control module 70 may change the physical properties of the graphical element such that the graphical element is more fragile and more susceptible to breaking.

The degree control module 74 may be configured to determine the degree or intensity in which the physical properties of a graphical element(s) are to be changed or modified. The degree may be determined based on the length of an input gesture (e.g. a stroke) in association with a scroll bar 82 (See e.g., FIG. 3). In other words, as the length of the input gesture in association with the scroll bar increases, the degree of changes to the physical properties of the corresponding graphical element also increases. On the other hand, a shorter length of the input gesture in association with the scroll bar 82, results in fewer changes to the physical properties of the graphical element.

The animation module 67 may be configured to move one or more graphical elements from one location to one or more other locations of the touch screen display 50. The physical properties of these graphical elements that are moved by the animation module may contain changed or adjusted physical properties.

Figure 3:
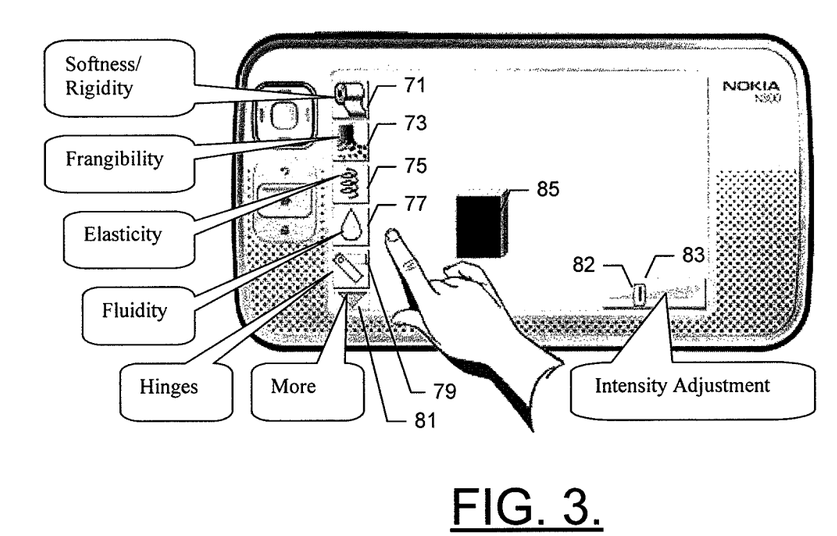
FIG. 3 shows an exemplary embodiment of an apparatus having a touch screen user input interface according to an exemplary embodiment.

FIG. 3 illustrates an exemplary embodiment of an apparatus having a touch screen interface and touch screen display according to an exemplary embodiment. In one exemplary embodiment, the apparatus of FIG. 3 may be employed on a mobile terminal (e.g., mobile terminal 10) capable of communication with other devices via a network.

The touch screen interface (e.g., touch screen interface 54) of the apparatus may include a softness/rigidity icon 71, a frangibility icon 73, an elasticity icon 75, a fluidity icon 77, a hinges icon 79, a more icon 81 and an intensity adjustment icon 83 having a scroll bar 82. The icons represent different physical attributes that may be applied to one or more graphical elements to adjust the graphical elements (e.g., graphical objects). The icons 71, 73, 75, 77, 79 and 81 may be controlled and operated by the physical attribute controller 65 and icon 83 may be controlled by the degree control module 74. The scroll bar 82 of the icon 83 may adjust the intensity of a selected physical attribute.

Each of the icons of FIG. 3 may be selected and activated by a stylus, finger, pen, pencil or any other pointing device coming into contact with a respective portion of the touch screen display (e.g., touch screen display 50) in a manner sufficient to register a touch. Additionally, a user may select one or more graphical elements (e.g., graphical element 85 such as for example a rectangle) that may be prestored in memory (e.g., memory device 58) and may apply one or more of the physical attributes associated with icons 71, 73, 75, 77, 79 and 81 to selected graphical elements.

It should be pointed out that the softness/rigidity icon 71 represents physical attributes that are configured to be applied to a graphical element to affect the softness or rigidity of the graphical element. The frangibility icon 73 represents physical attributes that are configured to be applied to a graphical element to make the graphical element more fragile and more susceptible to break into one more fragments. The elasticity icon 75 represents physical attributes that are configured to be applied to a graphical element to cause the graphical element to have spring-like properties. In this regard, a graphical element that is assigned an elasticity attribute may deform under stress (e.g., external force or pressure), but may return to its original shape when the stress is removed. The fluidity icon 77 represents physical attributes that are configured to be applied to a graphical element to make the graphical element appear as a graphical representation of a liquid. The hinges icon 79 represents physical attributes that are configured to be applied to one or more graphical elements to connect two solid objects allowing the objects to be rotated relative to each other about a fixed axis.

The more icon 81 represents any other suitable physical attributes that may be applied to one or more graphical elements. The adjustment of the scroll bar 82 associated with the intensity adjustment icon 83 affects the degree in which the physical properties of selected graphical elements are changed. In this regard, the more that the scroll bar is moved to the right, the more the physical properties of a graphical element are changed with respect to a selected physical attribute (e.g., elasticity). For purpose of illustration and not of limitation, when the elasticity attribute is applied to a graphical element upon selecting the elasticity icon 75 and the scroll bar of the intensity adjustment icon 83 is moved farthest to the right, the corresponding graphical element receives the highest possible elasticity setting.

As described above, upon selection of one or more of the icons 71, 73, 75, 77, 79 and 81, the physical attribute controller 65 is capable of assigning corresponding physical attributes to a selected graphical element (e.g., graphical element 85). In this regard, the physical attribute controller 65 is capable of assigning more than one attribute to a graphical element. As such, multiple physical attributes may be superposed on a selected graphical element. For instance, a graphical element such as for example a rectangle may be both elastic and fragile in response to the physical attribute controller 65 assigning the fragile and elasticity attributes upon selection of the frangibility icon 73 and the elasticity icon 75, as described more fully below with respect to FIG. 4C.

Figure 4A:
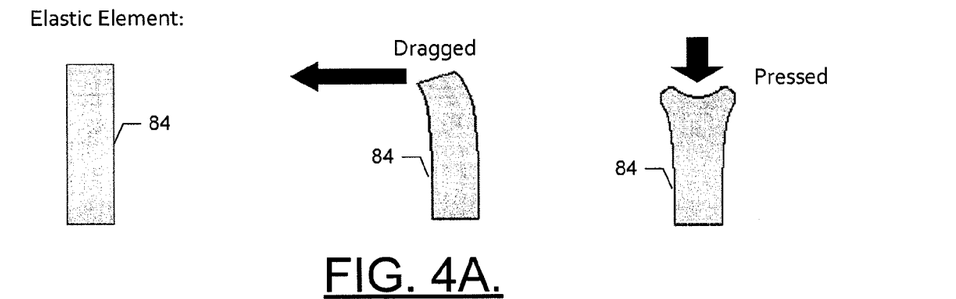

FIG. 4 illustrates an example of operation of the apparatus of FIG. 3 according to one embodiment. In this regard, FIG. 4A shows a selected graphical element 84 such as for example a rectangle and in response to selection of the elasticity icon 75, the physical attribute controller 65 may assign an elasticity attribute to the graphical element 84. In this regard, the deformation control module 70 may change the physical properties of the graphical element 84 such that the elasticity of the graphical element is increased. By utilizing a stroke event generated by a pointing device (e.g., pen, pencil, stylus, finger, etc.), the animations module 67 may allow portions of the graphical element to be dragged to left or right positions while contact is being made with corresponding portions of a touch screen display 50. When contact is no longer made with the corresponding portions of the touch screen display 50 (e.g., the stoke event is complete) the animations module 67 may allow the graphical element 84 which has the elasticity attribute to return to its original shape. Additionally, a stroke event may be utilized to depress portions of the graphical element 84 when contact is made with corresponding portions of the touch screen display. Once contact is no longer made with the corresponding portions of the touch screen display 54 by the pointing device, the animations module 67 may allow the graphical element 84 having the elasticity attribute which was previously depressed to return to its original shape.

Figure 4B:
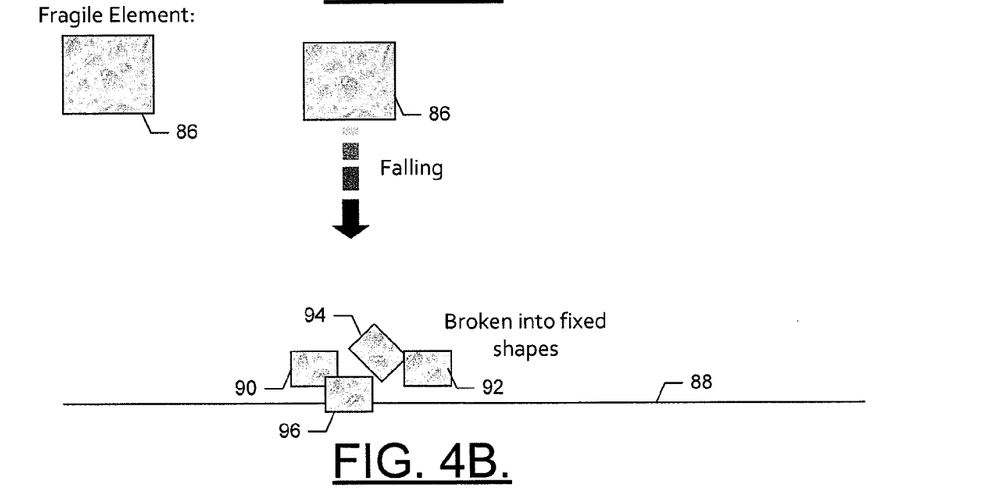

FIG. 4B shows a selected graphical element 86 such as for example a rectangle and in response to selection of the frangibility icon 73 by the pointing device, the physical attribute controller 65 may assign a fragile attribute to the graphical element 86. The deformation control module 70 may change the physical properties of the graphical element such that the graphical element 86 is more fragile and is more susceptible to being broken or fractured. In this regard, a stroke event generated by the pointing device may be utilized to select the graphical element 86 and move the graphical element in a downward position representing a fall. It should be pointed out that the animations module 67 may move the graphical element in the downward position. Once the graphical element 86 contacts another graphical object 88 (e.g., an edge of the touch screen display) with sufficient force, the animations module may cause the graphical element 86 having the fragile attribute to break into one or more fixed shapes 90, 92, 94, 96.

Figure 4C:
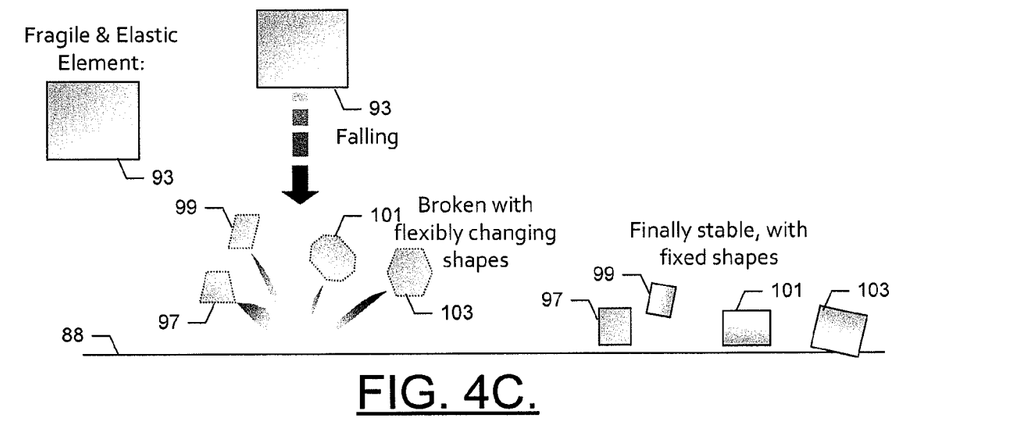

FIG. 4C shows a selected graphical element such as for example a rectangle and in response to selection of the frangibility icon 73, by the pointing device, the physical attribute controller 65 may assign a fragile attribute to the graphical element 93. The deformation control module 70 may change the physical properties of the graphical element 93 such that the graphical element is more fragile and is more susceptible to being broken or fractured. Subsequently, the physical attribute controller 65 may assign an elasticity attribute to the graphical element 93 in response to selection of the elasticity icon 75. In this regard, the deformation control module 70 may increase the elasticity of the graphical element and may superpose the elasticity properties on the fragile properties of the graphical element 93. In this regard, a stroke event generated by a pointer device may be utilized to select the graphical element 93 and in response the stroke event the animations module 67 may move the graphical element in a downward position representing a fall. Once the graphical element contacts another graphical object 88 with sufficient force, the animations module 67 may cause the graphical element 93 having the fragile and elastic attributes to break into one or more flexibly changing shapes 97, 99, 101 and 103 (due to the elasticity) and over time animations module 67 may allow the shapes 97, 99, 101 and 103 to stabilize and become fixed.

Figure 5:
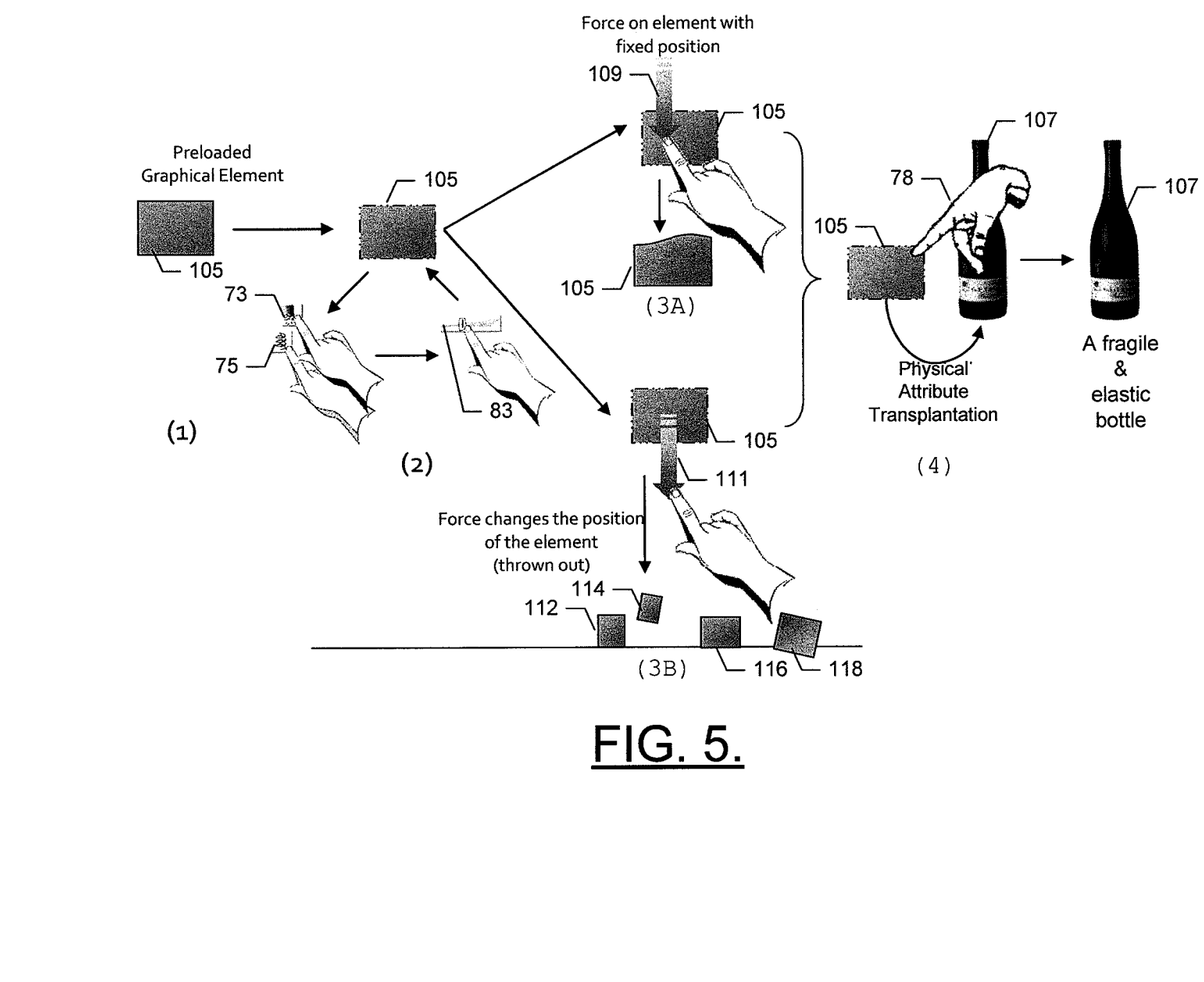
FIG. 5 shows an example of operation of the apparatus of FIG. 3 according to an exemplary embodiment of the present invention.

FIG. 5 illustrates an example of a process of operation of the apparatus of FIG. 3 according to one embodiment. FIG. 5 shows that a user may select one or more graphical elements that may be prestored in a memory (e.g., memory device 58). The geometrical elements may consist of basic or simple objects such as for example rectangles, squares, triangles, circles, ellipses, and any other suitable geometrical objects. In the exemplary embodiment of FIG. 5, the user selected a graphical element 105 in the form of a rectangle. (See block 1) Upon selecting the frangibility icon 73, by using a pointing device for example, the physical attribute controller 65 may assign a fragile attribute to the graphical element 105. The degree of fragility may be set, by the degree control module 74, based on an adjustment of the scroll bar associated with the intensity adjustment icon 83 (See block 2). In this regard, the physical properties of the graphical element 105 may be modified, by the deformation control module 70, to make the graphical element more fragile. Additionally, upon selecting another icon such as for example the elasticity icon 75, the physical attribute controller 65 may assign an elastic attribute to the graphical element. The degree of elasticity may be set, by the degree control module 74, based on an adjustment of the scroll bar associated with the intensity adjustment icon 83

(See block 2). The deformation control module 70 may then modify the physical properties of the graphical element 105 to make the graphical element more elastic. In this regard, the deformation control module 70 is capable of superposing multiple physical attributes on the same graphical element.

In order to test the effects of the physical attributes, such as for example, the fragile and elastic attributes that were applied to the graphical element of the rectangle, a user may apply external or internal forces to the graphical element 105 by utilizing a pointing device. The force may be applied to the graphical element by the deformation control module 70. In particular, the user may utilize an input gesture (e.g., touch gesture) or a stroke event to apply the force to the graphical element 105. It should be pointed out that the starting point of a touch gesture or stroke event may determine the manner in which the deformation control module 70 exerts a force and the strength and direction of the force may be determined by the deformation control module 70 based on a length of the stroke event. In this regard, a user may utilize a stroke event 109 to exert a force on a graphical element 105 which does not change the position of the graphical element (e.g., the position of the graphical element is fixed) by touching a portion of the touch screen display and moving or sliding a pointer (e.g., finger) in a direction that traverses a top portion of the graphical element. (See block 3A) In this regard, an internal force may be applied to the graphical element 105 by the deformation control module 70 and when an internal force is applied to the graphical element, a position of the graphical element may be unchanged or fixed.

A user may preview the effect of the force on the graphical element when the graphical element is in a fixed position. The preview may be generated by the animations module 67. The preview may end after a time period which may be predefined by the user. Alternatively, the time period may be set by the animations module 67. In the exemplary embodiment of FIG. 5, the force that is applied to the graphical element, by the deformation control module 67 causes a portion of the graphical element to be depressed. (See block 3A) It should be pointed out that the portion of the graphical element that is depressed is based in part on the physical properties of the graphical element being made more elastic by the deformation control module 70 as well as the strength and direction of the force that is applied to the graphical element 105.

Additionally, a user may utilize a stroke event 111, generated by a pointer, to exert a force on a graphical element which allows the animations module 67 to change the position of the graphical element 105 in response to touching an inner portion of the graphical element on the touch screen display 50 and moving or sliding a pointer (e.g., finger) in a downward direction to a portion of the display that is external to the graphical element. (See block 3B) In this regard, an external force may be applied, by the deformation control module 70, to the graphical element 105 and in response to an external force being applied to the graphical element a position of the graphical element may be changed by the animations module 67. A user may preview the effect of the force on the graphical element when the graphical element is in a changeable position, due to the force being applied, and the preview may end after a time period that may be predefined by the user. In the exemplary embodiment of FIG. 5, the force that is applied to the graphical element by the deformation control module 70 may cause the graphical element to be broken in pieces 112, 114, 116, 118. (See block 3B) As shown in FIG. 5, the external force may allow the animations module 67 to cause portions of the graphical element to be expelled or thrown out. It should be pointed out that the broken portions 112, 114, 116, 118 of the graphical element are based in part on the physical properties of the graphical element being made more fragile by the deformation control module 70 as well as the strength and direction of the force that is applied to the graphical element 105.

Once the user is satisfied with the physical properties that are applied to the graphical element based on the selected physical attributes and the effects of the forces that may be applied to the graphical element, the user may perform a dual touch 78 which triggers the attribute mapper 64 to transplant or transform the physical properties of the graphical element to a graphical object 107 (e.g., an image, picture, photograph or the like) which may, but need not, be more complex than the graphical element 105. For instance, the graphical object 107 may be a 3-D object whereas the graphical element 105 may be a 2-D object. In the exemplary embodiment of FIG. 5, the user may utilize at least two pointers, such as for example two fingers to signify transfer of the physical attributes and properties of the graphical element 105 to the graphical object 107 which in this example is image of a bottle. It should be pointed out that one of the fingers remains on the graphical element 105 and another finger may be moved from the graphical element 105 to the graphical element 107 to trigger transfer of the physical attributes and properties (e.g., dual touch 78). (See block 4) In response to the motion detected by the input analyzer 62 when the user performs the dual touch 78, the attribute mapper 64 is configured to transplant or transfer the physical attributes and properties of the graphical element (e.g., rectangle) to the graphical object (e.g., image of the bottle). In this regard, the graphical object 107 such as for example the image of the bottle has the same fragility and elasticity properties that were applied to the graphical element 105.

It should be pointed out that the image of the graphical object 107 that has the transplanted physical attributes and properties may be used in an animation generated by the animation module 67. In this regard, the animation module 67 may move the graphical object 107 from one location to another location in the touch screen display 50.

Figure 6:
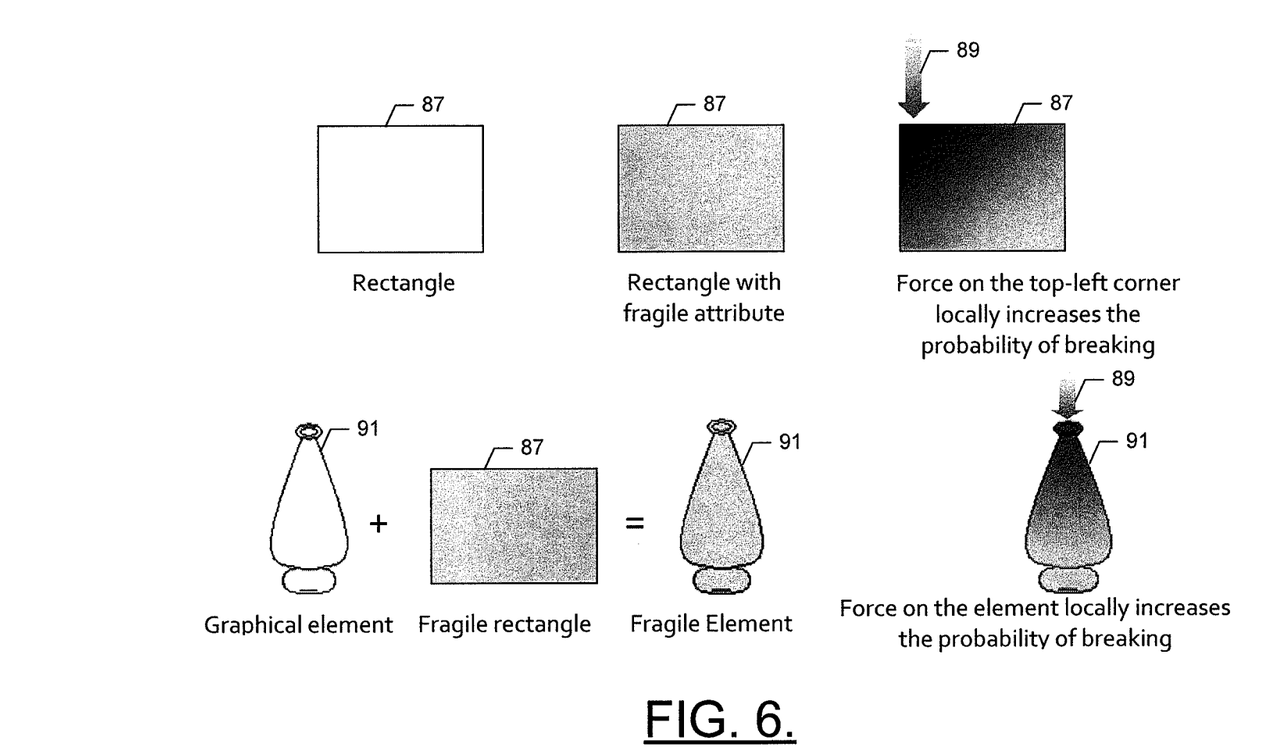
FIG. 6 shows another example of operation of the apparatus of FIG. 3 according to another exemplary embodiment of the present invention.

FIG. 6 shows another example of operation of the apparatus of FIG. 3 according to an exemplary embodiment. Additionally, FIG. 6 shows a probability of pixel separation with respect to a level of fragility associated with graphical elements. In the exemplary embodiment of FIG. 6, a user may select a graphical element that may be prestored in a memory (e.g., memory device 58). The graphical element 87 may be a graphical representation of a geometrical object and in the example of FIG. 6 the graphical element may be a representation of a rectangle. The frangibility icon 73 may be selected by a user, via a pointing device or the like, which may trigger the physical attribute controller 65 to assign a fragile attribute to the graphical element 87. In this regard, the deformation control module 70 may modify the physical properties of the graphical element to increase the fragileness of the graphical element 87. The degree in which the graphical element 87 may be made more fragile may be determined by the degree control module 74 in response to adjusting the scroll bar 82 of the intensity adjustment icon 83. It should be pointed out that in one embodiment the higher the intensity setting, the higher the probability that continuous separation of adjacent pixels within the rectangle area will occur. In this regard, the probability of pixel separation may be in proportion to the intensity setting. The relationship between pixel separation and intensity is relevant since it is the separation of the adjacent pixels that allows the animations module 67 to cause the graphical element 87 to be visually depicted as broken in one embodiment. Moreover, it should be pointed out that in one embodiment the higher the intensity setting the darker that the pixels corresponding to the graphical element will appear on the touch screen display 50.

As described above, a user may utilize an input gesture (e.g., touch gesture) or stroke event 89 to apply a force on a portion of the graphical element 87 having the fragile attribute. In the exemplary embodiment of FIG. 6, the force is applied to a top-left corner of the graphical element 87, by the deformation control module 70, which may increase the probability of the rectangle breaking. The position and strength of the external force applied by the deformation control module 70 may allow the animations module 67 to increase the local probability of pixel separation which may result in a darker color of the graphical element 87 as shown in FIG. 6. In this regard, the color of graphical element 87 may serve as an indication of the likelihood of the graphical element 87 breaking.

In response to a user performing the dual touch 78, e.g., touching both the graphical element 87 and the graphical object 91 in the manner described above, the attribute mapper 64 may transplant or transfer the physical attributes and properties of the graphical element 87 to the graphical object 91 which in this example is an image of a vase. In this regard, the graphical object 91 which may be more complex than the graphical element 87 has the physical attributes, properties and applied forces (based on the stroke event 89) that were assigned to the graphical element 87. Additionally, it should be pointed out that the pixels of the graphical object 91, that has the transplanted physical attributes and properties, correspond to the probability distribution of the pixels of the graphical element 87. In one embodiment, the attribute mapper 64 may transfer the probability distribution of the pixels of the graphical element 87 to the pixels of the graphical object 91.

Figure 7:
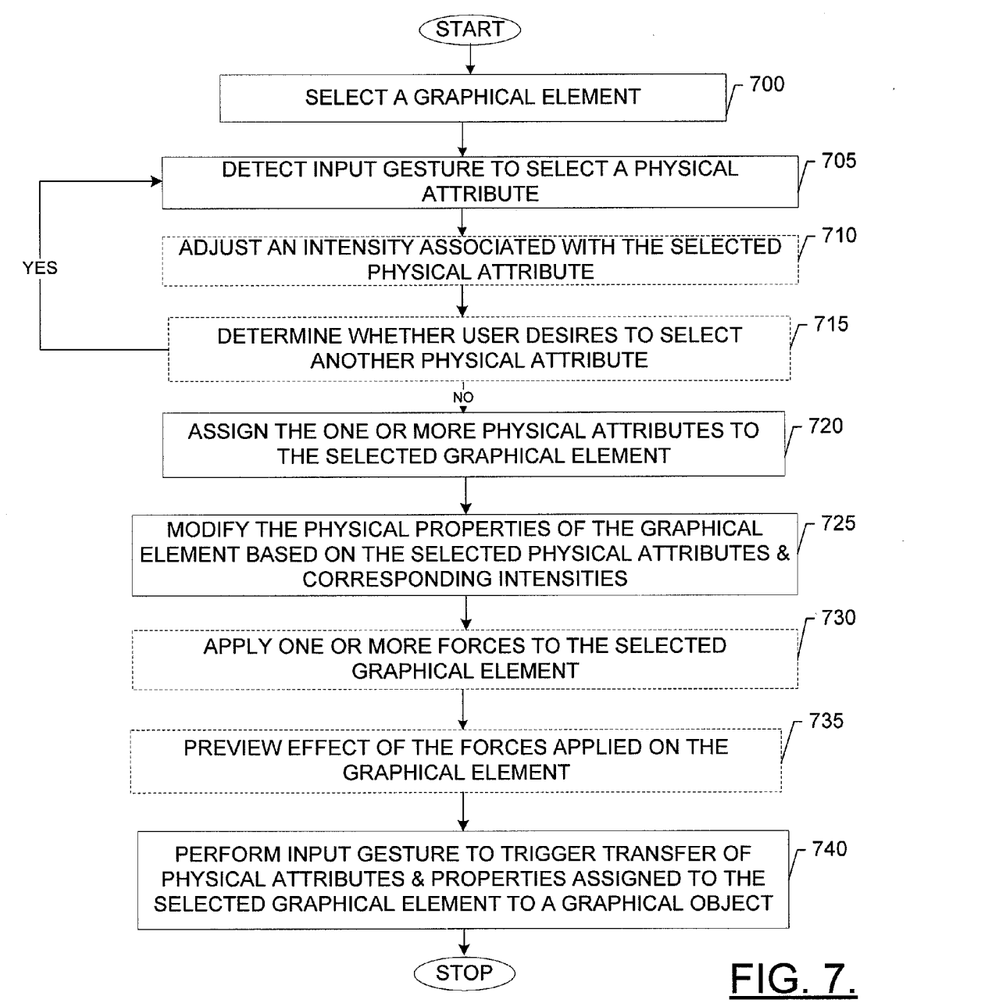
FIG. 7 illustrates a flowchart of an example operation of an exemplary embodiment of the present invention.

Referring now to FIG. 7, a flowchart for transferring one or more physical attributes and properties of a graphical element to a graphical object that may be used in an animation is provided. At operation 700, a graphical element may be selected. The graphical element may be prestored and selected from a memory (e.g., memory device 58). The graphical element may, but need not, be a geometrical object such as for example a rectangle, square, triangle, circle, ellipse or any other suitable geometrical object. The graphical element may consist of an image, picture, photograph or the like. At operation 705, a device (e.g., physical attribute controller 65) may detect an input gesture to select a predefined physical attribute from among a plurality of predefined physical attributes. The predefined physical attributes include but are not limited to softness, rigidity, frangibility, elasticity, fluidity, and manipulation of hinges. The input gesture may consist of a touch gesture to select an icon associated with a predefined physical attribute.

Optionally, at operation 710, an intensity associated with a selected physical attribute may be adjusted. The intensity may be adjusted by a device such as for example a degree control module 74 and the intensity may relate to a level or degree in which the selected physical attribute may be applied to a graphical element. Optionally, at operation 715, if a user desires to select another physical attribute, operations 705 and 710 are repeated. If a user does not desire to select another physical attribute, the process continues at operation 720. At operation 720, one or more physical attributes and the corresponding intensities may be assigned to the selected graphical element. In this regard, the physical attribute controller 65 may assign the one or more physical attributes to the selected graphical element and the degree control module 74 may assign the corresponding intensities to the selected graphical element. At operation 725, the physical properties of the graphical element may be modified based on the selected physical attributes and corresponding intensities. It should be pointed out that the deformation control module 70 may modify the physical properties of the selected graphical element based on the selected physical attributes and corresponding intensities.

Optionally, at operation 730, one or more forces may be applied to the selected graphical element based on a length and direction of a stroke event, in a manner analogous to that described above. Optionally, at operation 735, a preview of the effect of the forces applied on the selected graphical element may be generated. The preview may consist of an animation. At operation 740, an input gesture (e.g., a touch gesture such as for example a dual touch 78 gesture) may be performed to trigger transfer of the physical attributes and properties applied to the selected graphical element to a graphical object. The transfer of the physical attributes to the graphical element may be performed by the attribute mapper 64. The graphical object may be a complex graphical object. In this regard, the graphical object may, but need not, be a 3-D object and the graphical object may consist of an image, picture, photograph or the like. The graphical object having the transferred physical attributes and properties may be used in an animation generated by the animations module 67. The animation may be part of a video clip, video game or any other entertainment media consisting of sequential sequences of images.

It should be pointed out that FIG. 7 is a flowchart of a system, method and computer program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 58) and executed by a processor (e.g., the processor 52). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks or steps to be implemented. In some embodiments, the computer program instructions are stored in a computer-readable memory that can direct a computer or other programmable apparatus to function in a particular manner, such that the instructions stored in the computer-readable memory produce an article of manufacture including instructions which implement the function specified in the flowchart blocks or steps. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart blocks or steps.

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In an exemplary embodiment, an apparatus for performing the method of FIG. 7 above may comprise a processor (e.g., the processor 52) configured to perform some or each of the operations (700-740) described above. The processor may, for example, be configured to perform the operations (700-740) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-740 may comprise, for example, the processor 52 (e.g., as means for performing any of the operations described above), the physical attribute controller 65, the deformation control module 70, the degree control module 74, the animations module 67 and the attribute mapper 64 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving a selection of at least one physical attribute among a plurality of physical attributes;
   adjusting an intensity associated with the selected physical attribute;
   assigning the physical attribute to at least one graphical element;
   testing one or more physical effects corresponding to the assigned attribute;
   modifying one or more physical properties of the graphical element based on the physical attribute and the adjusted intensity;
   transferring, via a processor, the modified physical properties of the graphical element to at least one graphical object; and
   modifying the physical attributes by adjusting a degree in which the physical attribute is applied to the graphical element based on the intensity.

2. The method of claim 1, wherein prior to transferring the modified physical properties, the method further comprises applying at least one force to a portion of the graphical element.

3. The method of claim 2, further comprising moving the graphical object from a first location to at least one other location on a display in response to execution of an animation.

4. The method of claim 2, further comprising altering at least one of a shape or property of the graphical element based on the applied force.

5. The method of claim 2, further comprising determining a strength of the force based on a length and direction of a stroke detected via a touch screen, wherein the stroke comprises moving a pointer continuously from a first position to a second position on the touch screen.

6. The method of claim 5, further comprising determining that the force changes a position of the graphical element in response to the stroke being applied from the first position which is one of inside or outside the graphical element to the second position which is in a predefined direction relative to the first position and which is the other of inside or outside the graphical element.

7. The method of claim 5, further comprising determining that the force alters at least one of a shape or property of the graphical element but does not change the position of the graphical element in response to the stroke being applied from the first position which is one of inside or outside of the graphical element to the second position which is in a predetermined direction relative to the first position and which is the other of inside or outside the graphical element.

8. An apparatus comprising:
   at least one processor; and
   at least one memory including computer program code configured to, with the at least one processor, cause the apparatus to perform at least the following:
      receive a selection of at least one physical attribute among a plurality of physical attributes;
      adjust an intensity associated with the selected physical attribute;
      assign the physical attribute to at least one graphical element;
      modify one or more physical properties of the graphical element based on the physical attribute and the adjusted intensity;
      transfer the modified physical properties of the graphical element to at least one graphical object; and
      modify the physical attributes by adjusting a degree in which the physical attribute is applied to the graphical element based on the intensity.

9. The apparatus of claim 8, wherein the memory and computer program code are configured to, with the processor, cause the apparatus to:
   apply at least one force to a portion of the graphical element prior to the transfer.

10. The apparatus of claim 9, wherein the memory and computer program code are configured to, with the processor, cause the apparatus to:
    move the graphical object from a first location to at least one other location on a display in response to execution of an animation.

11. The apparatus of claim 9, wherein the memory and computer program code are configured to, with the processor, cause the apparatus to:
    alter at least one of a shape or property of the graphical element based on the applied force.

12. The apparatus of claim 9, wherein the memory and computer program code are configured to, with the processor, cause the apparatus to:
    determine a strength of the force based on a length and direction of a stroke detected via a touch screen, wherein the stroke comprises moving a pointer continuously from a first position to a second position on the touch screen.

13. The apparatus of claim 12, wherein the memory and computer program code are configured to, with the processor, cause the apparatus to:
determine that the force changes a position of the graphical element in response to the stroke being applied from the first position which is one of inside or outside the graphical element to the second position which is in a predefined direction relative to the first position and which is the other of inside or outside the graphical element.

14. The apparatus of claim 12, wherein the memory and computer program code are configured to, with the processor, cause the apparatus to:
determine that the force alters at least one of a shape or property of the graphical element but does not change the position of the graphical element in response to the stroke being applied from the first position which is one of inside or outside of the graphical element to the second position which is in a predefined direction relative to the first position and which is the other of inside or outside the graphical element.

15. A computer program product comprising at least one non-transitory computer-readable storage medium having computer-readable program code portions stored therein, the computer-readable program code portions comprising:

program code instructions for causing receipt of a selection of at least one physical attribute among a plurality of physical attributes;
program code instructions for adjusting an intensity associated with the selected physical attribute;
program code instructions for assigning the physical attribute to at least one graphical element;
program code instructions for modifying one or more physical properties of the graphical element based on the physical attribute and the adjusted intensity;
program code instructions for causing transfer of the modified physical properties of the graphical element to at least one graphical object; and
program code instructions for modifying the physical attributes by adjusting a degree in which the physical attribute is applied to the graphical element based on the intensity.

16. The computer program product of claim 15, further comprising program code instructions for causing application of at least one force to a portion of the graphical element prior to the transfer.

17. The computer program product of claim 16, further comprising program code instructions for moving the graphical object from a first location to at least one other location on a display in response to execution of an animation.

* * * * *